(12) United States Patent
Ashbacher et al.

(10) Patent No.: US 11,134,305 B2
(45) Date of Patent: Sep. 28, 2021

(54) CONTENT-MODIFICATION SYSTEM WITH VOLUME LEVEL ADJUSTMENT FEATURE

(71) Applicant: Roku, Inc., San Jose, CA (US)

(72) Inventors: Andrew Laurence Ashbacher, Aptos, CA (US); Steven Michael Cormie, Cambridge (GB); Stefanos Christakis Liassides, Cardiff (GB); Matthew George Grover, Cardiff (GB); Matthew Simon Pearce, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 16/835,635

(22) Filed: Mar. 31, 2020

(65) Prior Publication Data

US 2020/0359082 A1   Nov. 12, 2020

Related U.S. Application Data

(60) Provisional application No. 62/846,433, filed on May 10, 2019.

(51) Int. Cl.
*H04N 21/439* (2011.01)
*G06F 3/16* (2006.01)
(Continued)

(52) U.S. Cl.
CPC ......... *H04N 21/4394* (2013.01); *G06F 3/165* (2013.01); *H04N 21/44* (2013.01); *H04N 21/4852* (2013.01); *H04N 21/8456* (2013.01)

(58) Field of Classification Search
None
See application file for complete search history.

(56) References Cited

U.S. PATENT DOCUMENTS 9,146,990 B2  9/2015 Scherf et al.
9,495,451 B2  11/2016 Harron
(Continued)

FOREIGN PATENT DOCUMENTS

JP  2014204401 A  10/2014
WO  2018200099 A1  11/2018

OTHER PUBLICATIONS

International Searching Authority Written Opinion for PCT/US2020/032138 dated Aug. 20, 2020.
(Continued)

*Primary Examiner* — James R Marandi
(74) *Attorney, Agent, or Firm* — McDonnell Boehnen Hulbert & Berghoff LLP

(57) ABSTRACT

In one aspect, a method includes receiving first content at a content-presentation device and presenting the first content, the first content comprising a first audio-content component. The content-presentation device may receive second content comprising a second audio-content component. The content-presentation device may determine a switch time at which to switch from presenting the first content to presenting the second content. During a first time interval prior to the switch time and ending at the switch time, the volume of the first audio-content component may be decreased to zero. At the switch time, the content-presentation device may switch from presenting the first content to presenting the second content. During a second time interval beginning at the switch time and ending at a second time after the switch time, the volume of the second audio-content component may be increased from zero to a non-zero volume level.

20 Claims, 11 Drawing Sheets

(51) Int. Cl.
    *H04N 21/485*      (2011.01)
    *H04N 21/845*      (2011.01)
    *H04N 21/44*      (2011.01)

(56) References Cited

U.S. PATENT DOCUMENTS

| | | |
|---|---|---|
| 9,992,533 B2 | 6/2018 | Lee et al. |
| 10,506,275 B1 | 12/2019 | Thielen et al. |
| 2002/0013943 A1* | 1/2002 | Haberman .......... H04N 21/4786 |
| | | 725/39 |
| 2008/0059997 A1 | 3/2008 | Plotnick et al. |
| 2008/0165985 A1* | 7/2008 | Hsu .................... H04R 5/04 |
| | | 381/104 |
| 2010/0180203 A1 | 7/2010 | Tokita et al. |
| 2012/0170772 A1* | 7/2012 | Zheng .............. G11B 20/10527 |
| | | 381/107 |
| 2014/0031960 A1 | 1/2014 | Hill |
| 2014/0288686 A1* | 9/2014 | Sant .................. G11B 27/105 |
| | | 700/94 |
| 2020/0029108 A1 | 1/2020 | Dunker et al. |
| 2020/0059691 A1* | 2/2020 | Seo .................. H04N 21/44016 |

OTHER PUBLICATIONS

International Search Report for PCT/US2020/032138 dated Aug. 20, 2020.

\* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | |
|---|---|---|---|---|---|
| T9 | Compare first fingerprint data and second fingerprint data | | | | |
| T10 | Detect a match between first fingerprint data and second fingerprint data | | | | |
| T11 | Identify the channel on which the second content is being received | | | | |
| T12 | Generate metadata associated with the identified channel | | | | |
| T13 | Transmit an indication of the identified channel and the associated metadata | | | | |
| T14 | | | | | Receive the indication of the identified channel and the associated metadata |

Figure 4B

| T15 | | Determine historical content consumption data | | | |
|---|---|---|---|---|---|
| T16 | Transmit third content | | | | |
| T17 | Generate third fingerprint data and third metadata | | | | |
| T18 | Transmit third fingerprint data and third metadata | | | | |
| T19 | | | | | |
| T20 | | | Receive modifiable content segment | | |
| T21 | | | Generate fourth fingerprint data and fourth metadata | | |
| T22 | | | Transmit fourth fingerprint data and fourth metadata | Receive third fingerprint data and third metadata | |
| T23 | | | | Receive fourth fingerprint data and fourth metadata | |

Figure 4C

| | | | | | | |
|---|---|---|---|---|---|---|
| T24 | | | Compare at least a portion of third fingerprint data and at least a portion of fourth fingerprint data | | | |
| T25 | | | Detect a match between at least a portion of third fingerprint data and at least a portion of fourth fingerprint data | | | |
| T26 | | | Identify an upcoming content modification opportunity on the identified channel | | | |
| T27 | | | Transmit the third fingerprint data and the third metadata | | | |
| T28 | | | | Receive third fingerprint data and third metadata | | |
| T29 | | | | Receive fifth content | | |
| T30 | | | | Output for presentation fifth content | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | | | | Receive request and select supplemental content | | |
| T37 | | | | | Transmit request for link | | |
| T38 | | | | | | | Transmit link |

Figure 4E

| T39 | | | | Transmit link | | | |
|---|---|---|---|---|---|---|---|
| T40 | Receive link and retrieve supplemental content | | | | | | |
| T41 | Perform content modification operation | | | | | | |

Figure 4F

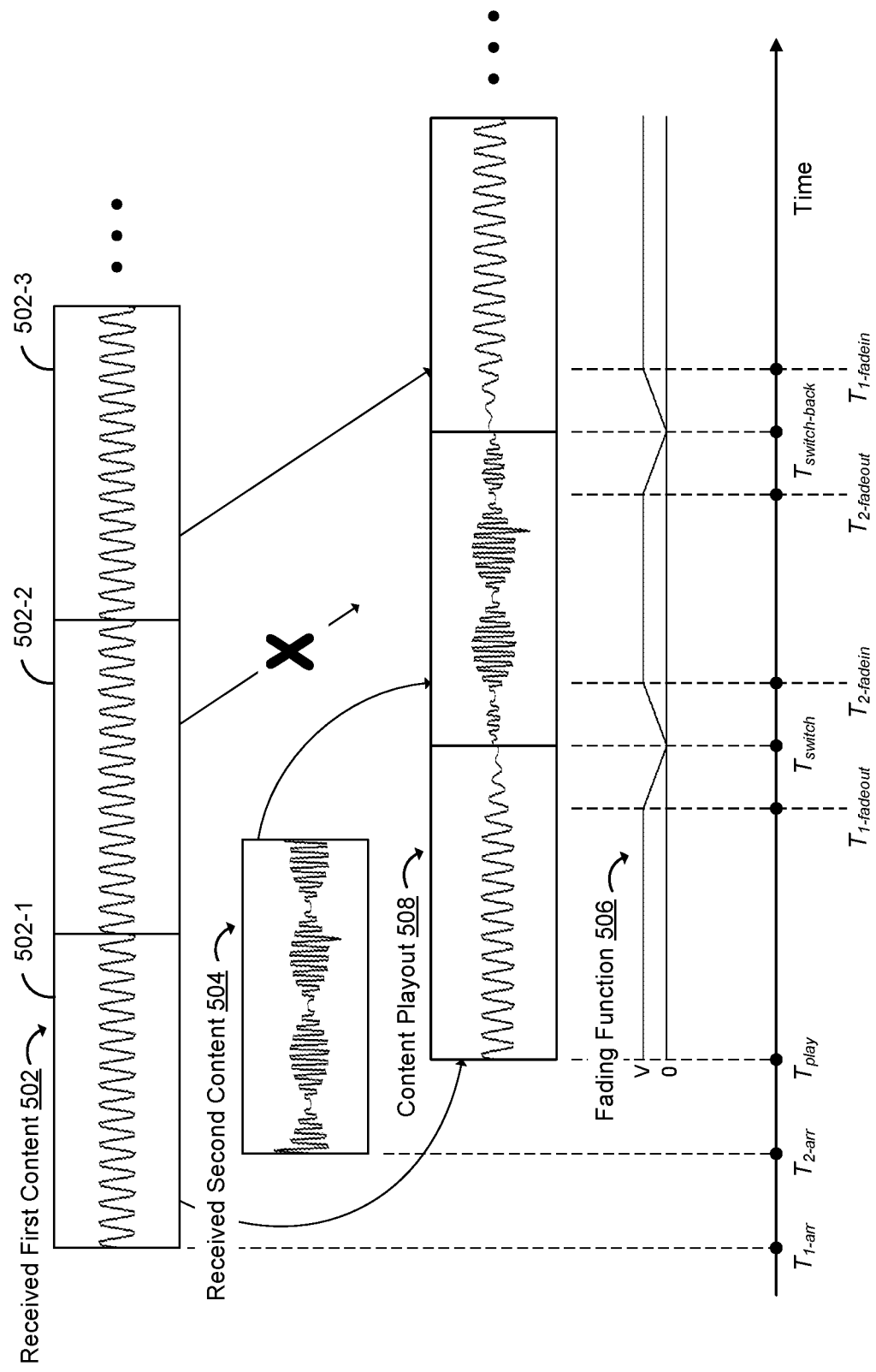

US 11,134,305 B2

CONTENT-MODIFICATION SYSTEM WITH VOLUME LEVEL ADJUSTMENT FEATURE

CROSS-REFERENCE TO RELATED APPLICATIONS

This application claims priority under 35 U.S.C. § 119(e) to U.S. Provisional Patent Application Ser. No. 62/846,433, filed on May 10, 2019, which is incorporated herein in its entirety by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes receiving first content at a content-presentation device and presenting the first content by the content-presentation device, the first content comprising at least a first audio-content component, wherein presenting the first content comprises playing out at least a portion of the first audio-content component at a first adjustable volume; receiving second content at the content-presentation device, the second content comprising at least a second audio-content component; determining an upcoming switch time at which to both (i) cease presenting the first content by the content-presentation device and (ii) begin presenting the second content by the content-presentation device, wherein presenting the second content comprises playing out at least a portion of the second audio-content component at a second adjustable volume; during a first time interval beginning at a first time prior to the switch time and ending at the switch time, fading the first adjustable volume of the first audio-content component to zero by the end of the first time interval; at the switch time, switching from presenting the first content to presenting the second content by the content-presentation device; and during a second time interval beginning at the switch time and ending at a second time after the switch time, increasing the second adjustable volume of the second audio-content component from zero to a non-zero volume level by the end of the second time interval.

In another aspect, a content-presentation device includes a content-presentation element configured for presenting content received by the content-presentation device, one or more processors and a non-transitory computer-readable storage medium having stored thereon program instructions that, upon execution by the one or processors, cause the content-presentation device to carry out operations. The operations include receiving first content and presenting the first content by the content-presentation element, the first content comprising at least a first audio-content component, wherein presenting the first content comprises playing out at least a portion of the first audio-content component at a first adjustable volume; receiving second content, the second content comprising at least a second audio-content component; determining an upcoming switch time at which to both (i) cease presenting the first content by the content-presentation element and (ii) begin presenting the second content by the content-presentation element, wherein presenting the second content comprises playing out at least a portion of the second audio-content component at a second adjustable volume; during a first time interval beginning at a first time prior to the switch time and ending at the switch time, fading the first adjustable volume of the first audio-content component to zero by the end of the first time interval; at the switch time, switching from presenting the first content to presenting the second content by the content-presentation element; and during a second time interval beginning at the switch time and ending at a second time after the switch time, increasing the second adjustable volume of the second audio-content component from zero to a non-zero volume level by the end of the second time interval.

In another aspect, non-transitory computer-readable storage medium has stored thereon program instructions that, upon execution by one or more processors of a system comprising a content-presentation device, cause the system to carry out operations. The operations include receiving first content at the system and presenting the first content by the content-presentation device, the first content comprising at least a first audio-content component, wherein presenting the first content comprises playing out at least a portion of the first audio-content component at a first adjustable volume; receiving second content at the system, the second content comprising at least a second audio-content component; determining an upcoming switch time at which to both (i) cease presenting the first content by the content-presentation device and (ii) begin presenting the second content by the content-presentation device, wherein presenting the second content comprises playing out at least a portion of the second audio-content component at a second adjustable volume; during a first time interval beginning at a first time prior to the switch time and ending at the switch time, fading the first adjustable volume of the first audio-content component to zero by the end of the first time interval; at the switch time, switching from presenting the first content to presenting the second content by the content-presentation device; and during a second time interval beginning at the switch time and ending at a second time after the switch time, increasing the second adjustable volume of the second audio-content component from zero to a non-zero volume level by the end of the second time interval.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

FIG. 5 is an illustration of example operation of volume adjustment that can be performed in connection with the example content-modification system

DETAILED DESCRIPTION

I. Overview

Figure 1:
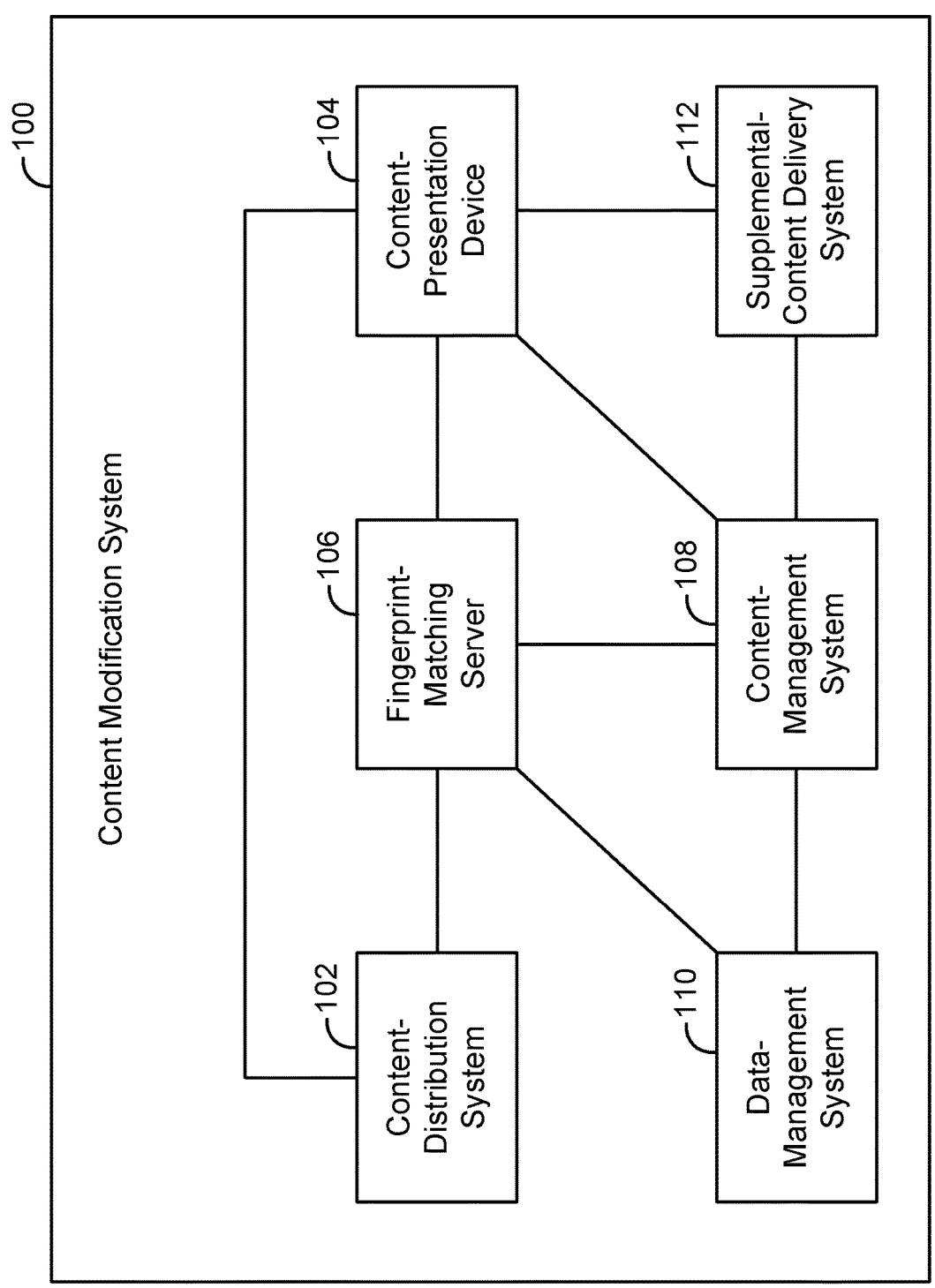
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

Content replacement operations can entail an abrupt switch in content playout at the point in time at which content replacement begins and/or at the point in time at which replacement ends and playout of the originally presented content resumes. In practice, an abrupt switch—one with an instantaneous or nearly instantaneous time boundary—may result in one or more audio artifacts near the boundary if the audio content differs on either side of the boundary. There can be various reasons for the production of such audio artifacts, but they may generally be at least partially the result of discontinuities in audio signals at the boundary, and how these discontinuities can affect signal processing involved in converting the signals to sound by sound-production components or elements of a content-presentation device. It can therefore be desirable to account for an abrupt switch in audio-content playout (presentation) at a boundary when content replacement commences, and mitigate or eliminate audible audio artifacts that may arise at and/or near the boundary. Advantageously, this may be achieved by adjusting the playout volume of audio content in a temporal region that includes a boundary where a switch in audio-content playout occurs.

Accordingly, a content-presentation device can adjust a volume setting of the content-presentation device in connection with performing a content modification/replacement operation. Doing so may reduce or eliminate audible audio artifacts.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification 100 is likely to include many content-distribution systems and many content-presentation devices.

B. Computing System

Figure 2:
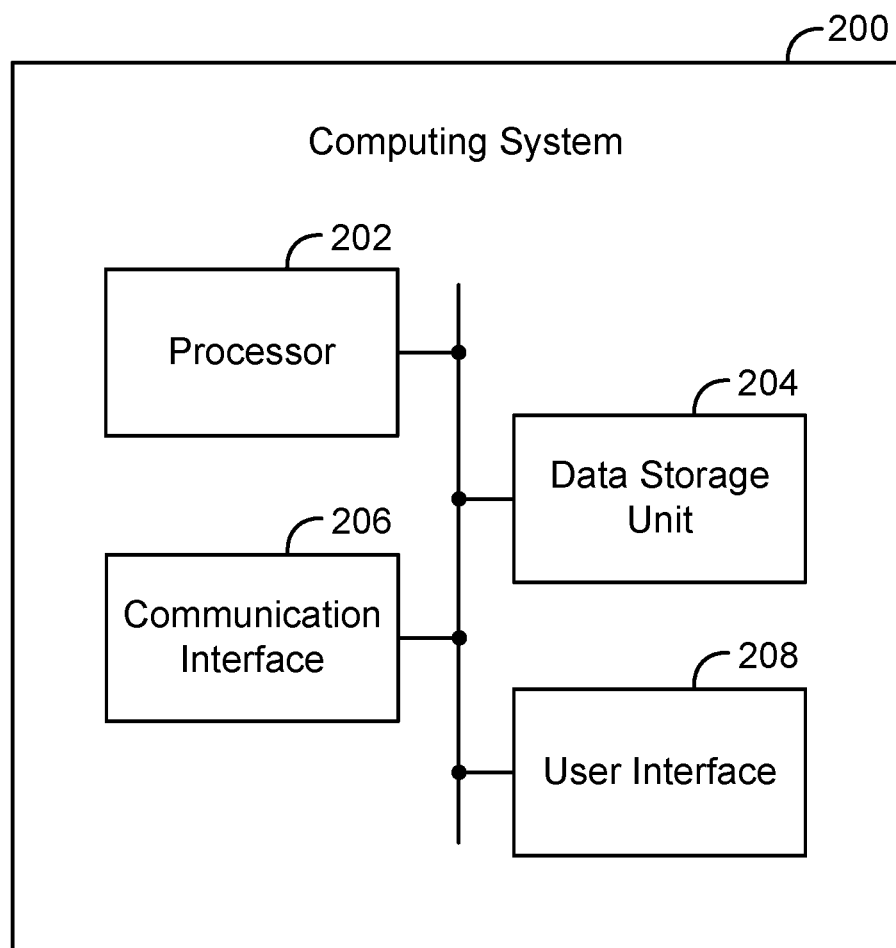
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
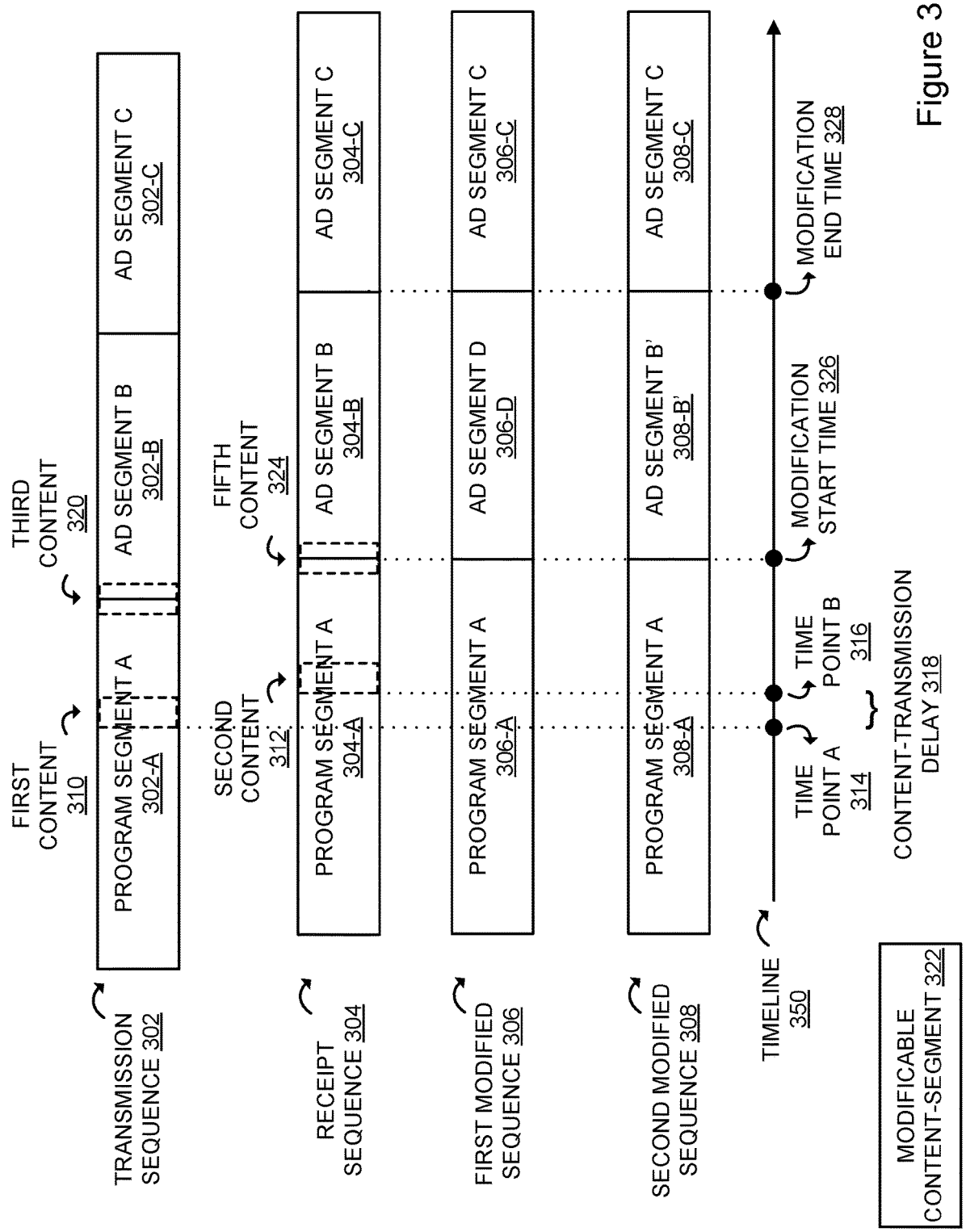
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A 302-A, followed by an AD SEGMENT B 302-B, followed by AD SEGMENT C 302-C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A 304-A, followed by the AD SEGMENT B 304-B, followed by the AD SEGMENT C 302-C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A 306-A, followed by the AD SEGMENT D 306-D (which replaced the AD SEGMENT B 304-B), followed by AD SEGMENT C 306-C.

As another example, it can be desirable for the content-presentation device 104 to overlay, on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A 308-A, followed by the AD SEGMENT B' 308-B' (which is the AD SEGMENT B 304-B modified with overlay content), followed by AD SEGMENT C 308-C.

Other portions of FIG. 3 will be described later in this disclosure as related concepts are introduced and described.

Moving on in view of the context provided above, FIGS. 4A, 4B, 4C, 4D, 4E and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT 322 shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content modification opportunity on the identified channel. For example, the fingerprint-matching server 106 can determine that at least a beginning portion of the MODIFIABLE CONTENT-SEGMENT 322 is included within the THIRD CONTENT 320, as shown in FIG. 3, and therefore can identify an upcoming content modification opportunity.

As noted above, the fingerprint-matching server 106 can generate third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame market, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A 304-A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation 104 device to replace at least a portion of the AD SEGMENT B 304-B with at least a portion of a different advertisement segment that is perhaps more targeted to the end-user. As another example, it can be desirable for the content-presentation device 104 to overlay on at least a portion of the AD SEGMENT B 304-B, overlay content that enhances at least a portion of the AD SEGMENT B 304-B in a way that is again perhaps more targeted to the end-user.

During a time-period T31, the content-presentation device 104 can generate fingerprint data representing the fifth content. This fingerprint data is referred to herein as "fifth fingerprint data." The content-distribution system 102 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The fingerprint-matching server 106 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the third fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B 302-B with the AD SEGMENT B 304-B. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B 302-B, thereby modifying it to AD SEGMENT B 304-B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Adjusting Audio Volume of Content During Content Modification by a Content-Presentation Device As described above, content delivered to and presented by a content-presentation device, such as content-presentation device 104, may include audio content, possibly in addition to video content and/or other media content, for example. As such, presentation of content that includes audio content can entail playout of the audio content by the content-presentation device. If the content also includes video content, then presentation can entail playout of the video content by the content-presentation device. Various technologies and techniques may be used or implemented by a content-presentation device to play out audio and/or video content (e.g. media).

The content replacement operations described above can entail an abrupt switch in content playout at the point in time at which content replacement begins and/or at the point in time at which replacement ends and playout of the originally presented content resumes, such as the modification start time 326 and modification end time 328 described above in connection with FIG. 3. In practice, an abrupt switch—one with an instantaneous or nearly instantaneous time boundary—may result in one or more audio artifacts near the boundary if the audio content differs on either side of the boundary. There can be various reasons for the production of such audio artifacts, but they may generally be at least partially the result of discontinuities in audio signals at the boundary, and how these discontinuities can affect signal processing involved in converting the signals to sound by sound-production components or elements of a content-presentation device. It can therefore be desirable to account for an abrupt switch in audio-content playout (presentation) at a boundary when content replacement commences, and mitigate or eliminate audible audio artifacts that may arise at and/or near the boundary. As described below, this may be achieved by adjusting the playout volume of audio content in a temporal region that includes a boundary where a switch in audio-content playout occurs.

Accordingly, in another aspect of the disclosure, the content-presentation device 104 can adjust a volume setting of the content-presentation device 104 in connection with performing a content modification operation. Examples of volume adjustment will first be described in general terms, after which a more detailed description is presented, also by way of example.

To begin with, the content-presentation device 104 can receive and present first content. The content-presentation device 104 can also receive second content. In one example, the content-presentation device 104 can receive the first content via a first input of the content-presentation device and can receive the second content via a second input of the content-presentation device 104. The second input can be different from the first input.

The content-presentation device 104 can then switch from presenting the received first content to presenting the received second content. During a first time period (e.g., less than one second) spanning from a first time point until a time point of the switching, the content-presentation device 104 can adjust a volume setting of the content-presentation device 104 such that a volume level of the received first content decreases during the first time period. In one example, adjusting the volume setting of the content-presentation device 104 in this way involves decreasing the volume level from an audible volume level to a mute volume level.

In addition, during a second time period (e.g., less than one second) spanning from the switching time point to a second time point, the content-presentation device 104 can adjust the volume setting of the content-presentation device 104 such that the volume level of an audio portion of the received second content increases during the second time period. In one example, adjusting the volume setting of the content-presentation device 104 in this way involves increasing the volume level from a mute volume level to an audible volume level.

In one example, adjusting the volume level during the first time period involves decreasing the volume from an initial volume level and adjusting the volume level during the second time period involves increasing the volume back to the initial volume level.

A more detail example of volume adjustment is illustrated in FIG. 5, which shows certain example operations that may be carried out by the content-presentation device 104, for example. The example operations are represented temporally with reference to a time line labeled "Time" at the bottom of the figure; time increases to the right, as indicated by the time line arrow.

As shown, the content-presentation device 104 may receive Received First Content 502 beginning a time $T_{1\text{-}arr}$, where the subscript "1-arr" signifies "first content arrival time." By way of example, Received First Content 502 includes three segments, 502-1, 502-2, and 502-3. Horizontal ellipses to the right of segment 502-3 indicates that there can be additional segments in the Received First Content 502. As also shown, the content-presentation device 104 may receive Received Second Content 504 beginning a time $T_{2\text{-}arr}$, where the subscript "2-arr" signifies "second content arrival time." By way of example, Received Second Content 502 includes just one segment, and also by way of example, $T_{2\text{-}arr}$ is greater than (occurs later than) $T_{1\text{-}arr}$.

In an example, Received First Content 502 may be received on a first input of the content-presentation device 104, and Received Second Content 504 may be received on a first input of the content-presentation device 104. For example, the first input could be a cable interface or an HDMI interface to a content-distribution system 102, and the second input could be broadband connection to the Internet. Other arrangements are possible as well. For example as single cable connection could support separate internal first and second interfaces for receiving content from a content distribution system and a web-based content provider. The sources of the Received First Content 502 and the Received Second Content 504 may be the same or different. For example, the Received First Content 502 may be received from a content-distribution system, and the Received Second Content 504 may be received from a web-based content provider. Either or both of the Received First Content 502 and the Received Second Content 504 may be received into a respective buffer of the content-presentation device in preparation for playout (presentation).

Received First Content 502 may include a first audio-content component and Received Second Content 504 may include a second audio-content component. The term audio-content component may refer to audio media data that can be played out by an audio presentation device, for example. Audio media data may be analog and/or digital. In FIG. 5, the first audio-content component is represented graphically by uniform-amplitude oscillating wave (e.g., sinewave). Similarly, the second audio-content component is represented graphically by an amplitude-modulate oscillating wave (e.g., amplitude-modulated sinewave). These representations are for illustrative purposes only, and provide a visual cue in FIG. 5 for distinguishing between the first and second audio components. No particular significance should be attached to the illustrated wave forms other than the convenience afforded to visually distinguishing between them.

It should be understood that either or both of the Received First Content 504 and the Received Second Content 504 may also include video components and/or other forms of media content besides audio content. The absence of any apparent illustrative graphic representation of video and/or other media content is only for the sake of brevity in FIG. 5, which serves mainly illustrate example operations relating to audio processing in connection with volume adjustment. Operations involving presentation of other forms of media content (e.g. video playout) can also be carried out concurrently by the content-presentation device, in accordance with the descriptions and discussion above.

Continuing with the discussion of FIG. 5, playout of the received content may begin at $T_{play}$, as shown. Playout is represented in FIG. 5 as Content Playout 508, and begins with playout of segment 502-1. At time $T_{switch}$, which occurs at the end of segment 502-1, playout is switched to Received Second Content 504. Then, at time $T_{switch\text{-}back}$, which occurs at the end of Received Second Content 504, playout is switched to segment 502-3. In accordance with the content replacement operations described above, segment 502-2, which is received in Received First Content 502, is replaced during playout (presentation) with the Received Second Content 504. The details of how this content replacement is achieved are described above. In the context of the earlier detailed discussion of content replacement operations (and related operations), $T_{switch}$ may be considered as corresponding to Modification Start Time 326, and $T_{switch\text{-}back}$ may be considered corresponding as to Modification End Time 328.

In accordance with example embodiments, the content-presentation device may determine $T_{switch}$ to coincide with both (1) a first point during playout first content at which the first content has been pre-determined to be replaceable with alternate content and (2) a second point during playout of second content at which second content has been pre-determined to be replacement content. In the context of the example operation illustrated in FIG. 5, the content-presentation device may determine that when Received First Content 502 is being played out, beginning at $T_{play}$, the point at which segment 502-2 will begin marks the point at which Received First Content 502 is replaceable. The content-presentation device may also determine that the beginning of Received Second Content 504 marks the point at which Received Second Content 504 is replacement content. The content-presentation device may the set $T_{switch}$ to the time at which playout in Content Playout 508 of segment 502-1 will end and segment 502-2 would begin if no replacement were to take place. In this way $T_{switch}$ may be aligned with the end playout of segment 502-1 and the beginning of playout of Received Second Content 504. The content-presentation device may similarly determine $T_{switch\text{-}back}$ to be aligned with the end of playout of Received Second Content 504 and the beginning of playout of segment 502-3.

In further accordance with example embodiments, the content-presentation device may determine both $T_{switch}$ and $T_{switch\text{-}back}$ as just described using metadata respectively associated with the Received First Content 502 and the Received Second Content 504. The content-presentation device may receive the respective metadata with receipt of the Received First Content 502 and the Received Second Content 504, or it may receive it separately. Details of metadata associated with received content, is describe above in connection with the detailed discussion of content-replacement operations.

The correspondence between the received content and content playout in FIG. 5 is indicated by the arrows pointing from the received content segments to corresponding playout segments in the Content Playout 508. The replacement of segment 502-2 in the Content Playout 508 is indicated by a bold "X" that interrupts the arrow from segment 502-2 toward the middle segment of Content Playout 508, and the curved arrow from Received Second Content 504 to the middle segment of Content Playout 508. The replacement is also illustrated graphically by the distinct waveforms described above that represent the first and second content.

The relationship between the times at which the first and second contents are received (also referred to as arrival times) and playout time, switch time, and switch-back time marked on the time line in FIG. 5 are intended as illustrative for purposes of the example operation of the present discussion. There can be various causes of and/or reasons for the illustrated delay between arrival and playout times. For example, arriving (received) content may be placed in a buffer before playout. In other example operation, there may be no delay between arrival and playout. This may be the case in operations that include synchronized timing between the content-distribution system and the content-presentation device, for example. The inclusion of a time lag between content arrival and content playout in the illustrated example serves to generalize various temporal aspects of operation As described above, the abrupt switch between playout of Received First Content 502 and Received Second Content 504 at both $T_{switch}$ and $T_{switch-back}$ may give rise to one or more audio artifacts. These artifacts may be suppressed or eliminated—at least as perceptible audio playout—by appropriately adjusting the audio volume during time intervals neighboring $T_{switch}$ and $T_{switch-back}$. Example operation of this volume adjustment is now described.

During a first time interval starting a $T_{1\text{-}fadeout}$ prior to $T_{switch}$ and ending at $T_{switch}$, the volume of the audio component of segment 502-1 playout may be reduced from a current playout level to zero by the time playout reaches $T_{switch}$. Then, during a second time interval starting at $T_{switch}$ and ending at a subsequent time $T_{2\text{-}fadein}$, the audio component of Received Second Content 504 playout may be increased from zero to a non-zero level by the time playout reaches $T_{2\text{-}fadein}$. In accordance with example embodiments, the decrease in volume during the first time interval may be gradual. Similarly, the increase in volume during the second time interval may be gradual. As such, the decrease and increase in volume may be characterized as fading out and fading in. Hence the terminology the $T_{1\text{-}fadeout}$, $T_{2\text{-}fadein}$, $T_{2\text{-}fadeout}$ and $T_{1\text{-}fadein}$. Also in accordance with example embodiments, the total time of the first and second time intervals around $T_{switch}$ may be arranged to be large enough to encompass the duration of any audio artifacts that result from the switch in content play out, but short enough to make the fading out and fading in imperceptible or nearly so to a user. In practice, the first and second time intervals may be one second or less.

A similar, but reverse, fading out and fading in may be used around $T_{switch-back}$, when playout switches back from Received Second Content 504 to segment 502-3 of Received First Content. In this case, fade out of Received Second Content 504 may begin at $T_{2\text{-}fadeout}$ and last until $T_{switch-back}$, bring the playout volume to zero. Then fade in may begin at $T_{switch-back}$ and last until $T_{1\text{-}fadein}$, bringing playout volume from zero to a non-zero level.

Fading out and fading in may be described in terms of a volume adjustment function applied to the adjustable output volumes during playout. An example function is represented in FIG. 5 as Fading Function 506 that may be applied to adjustable volume levels of playout to the respective audio components of Received First Content 502 and Received Second Content 504. As shown, the Fading Function 506 maintains a constant, positive level V except over the fading out and fading in intervals. By way of example, fading out and fading in portions the Fading Function 506 are shown as linear decreases to zero and increases from zero of the function level. However, other functional forms of decreasing and increasing volume may be used as well.

The effect of the Fading Function 506 on the playout volume in Content Playout 508 is also depicted in FIG. 5. As shown by way of example and for illustrative purposes, the waveforms of the respective audio components of first and second content decrease in amplitude to zero during the fading out portions of the Fading Function 506, and increase in amplitude from zero to a positive level during the fading in portions of the Fading Function 506. Advantageously, this fading out and fading in can mask or eliminate any perceptible audio artifacts, such that there is no audible output of audio artifacts at the points at which the content-presentation device switch content. It is noted that the Fading Function 506 may be only a convenient concept for discussing volume adjustment, and that volume adjustment could be implemented without necessarily using an explicit fading function.

Figure 6:
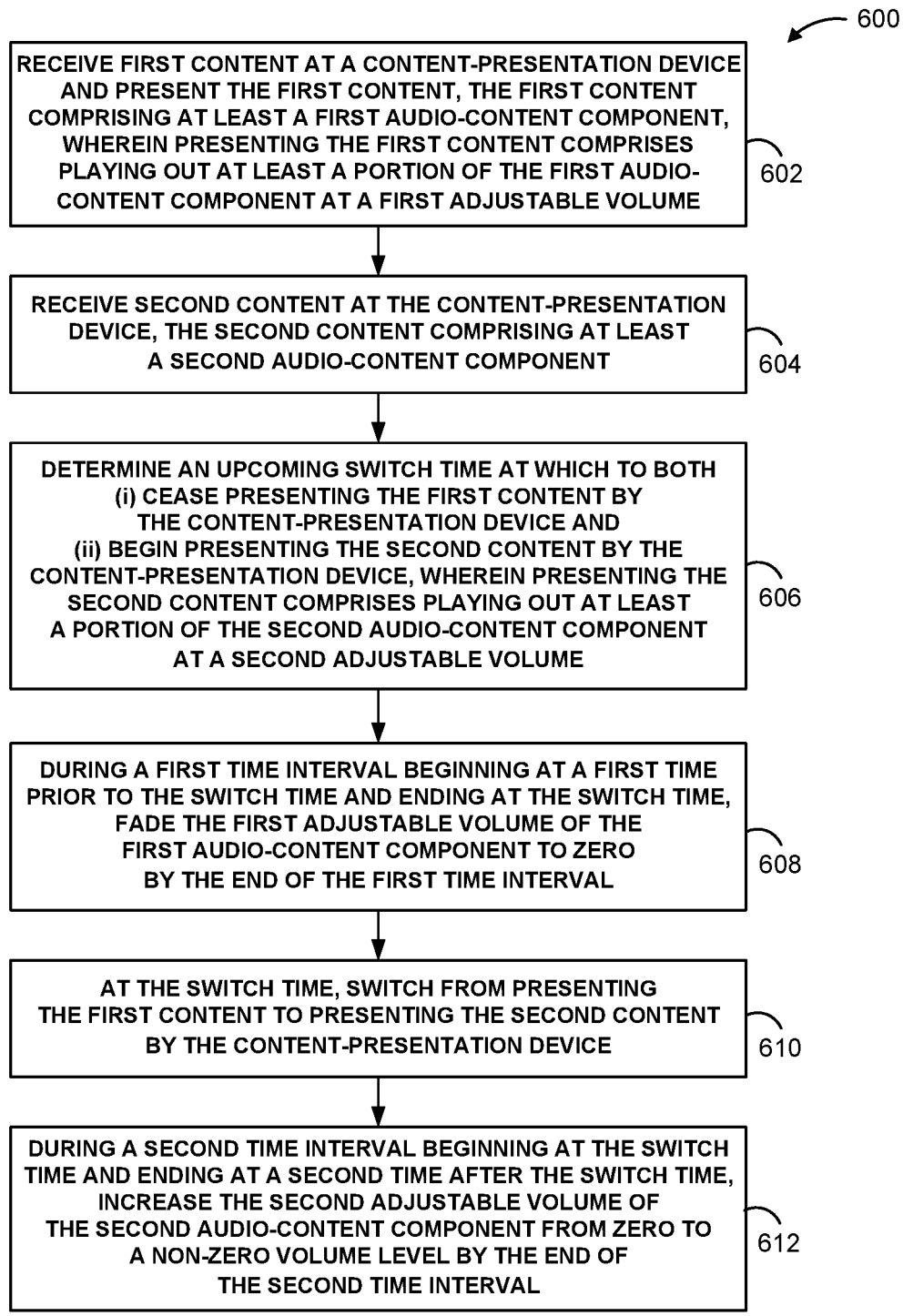
FIG. 6 is a flow chart of an example method.

FIG. 6 is a flow chart of an example method 600 of volume adjustment that could be carried out in connection with, or in the context of, content modification, such as that described above. The example method 600 could be implemented on and/or carried out by a computing system, such as computing system 200 described above, that includes content-presentation capabilities and/or functions. An example of such computing system is the content-presentation device 108, also described above. In particular, the example method 600 could be implemented on and/or carried an example content-presentation device that may include a content-presentation element configured for presenting content received by the content-presentation device, one or more processors, and a non-transitory computer-readable storage medium having stored thereon program instructions that, upon execution by the one or processors, cause the content-presentation device to carry out operations including operations of example method 600. An example content-presentation element may include a video display device configured for playing out video-content data, and/or an audio playout device configured for playing out audio-content data. Other forms of content-presentation elements may be possible as well.

At block 602, the method 600 includes receiving first content at a content-presentation device and presenting the first content by the content-presentation device. The first content may include at least a first audio-content component, and presenting the first content may involve playing out at least a portion of the first audio-content component at a first adjustable volume. An example of received first content is Received First Content 502 illustrated in FIG. 5 as discussed above. An example of presenting the first content is represented as the first and third segments of Content Playout 508, also illustrated in FIG. 5.

At block 604, the method 600 includes receiving second content at the content-presentation device. The second content may include at least a second audio-content component. An example of received second content is Received Second Content 504 also illustrated in FIG. 5 as discussed above.

At block 606, the method 600 includes determining an upcoming switch time at which to both (i) cease presenting the first content by the content-presentation device and (ii) begin presenting the second content by the content-presentation device. Presenting the second content may involve playing out at least a portion of the second audio-content component at a second adjustable volume. An example of the switch time is $T_{switch}$ illustrated in FIG. 5, as discussed above.

At block 608, the method 600 includes fading the first adjustable volume of the first audio-content component to zero during a first time interval that leads up to the switch time. Specifically the first time interval may begin at a first time prior to the switch time and end at the switch time. Fading the first adjustable volume of the first audio-content component may then entail fading the first adjustable volume of the first audio-content component to zero by the end of the first time interval. An example of the first time interval is the time interval between $T_{1\text{-}fadeout}$ and $T_{switch}$ illustrated in FIG. 5, as discussed above. An example of fading out the first adjustable volume is represented by the portion of the Fading Function 506 during the first time interval illustrated in FIG. 5.

At block 610, the method 600 includes switching from presenting the first content to presenting the second content by the content-presentation device at the switch time. An example of switch is represented as the replacement of segment 502-2 of Received First Content 502 with Received Second Content 504 in Content Playout 508 illustrated in FIG. 5, as discussed above. As shown, the switch (replacement) begins at $T_{switch}$.

Finally, at block 612, the method 600 includes increasing the second adjustable volume of the second audio-content component from zero to a non-zero volume level during a second time interval that follows the switch time. Specifically, the second time interval may begin at the switch time and end at a second time after the switch time. Increasing the second adjustable volume of the second audio-content component may then entail increasing the second adjustable volume of the second audio-content component from zero to a non-zero volume level by the end of the second time interval. An example of the second time interval is the time interval between and $T_{switch}$ and $T_{2\text{-}fadein}$ illustrated in FIG. 5, as discussed above. An example of increasing the second adjustable volume is represented by the portion of the Fading Function 506 during the second time interval illustrated in FIG. 5.

In accordance with example embodiments, the first content may further include a first video-content component. As such, presenting the first content may further involve playing out at least a portion of the first video-content component. Similarly, the second content may further include a second video-content component, and presenting the second content may then further involve playing out at least a portion of the second video-content component.

In further accordance with example embodiments, switching from presenting the first content to presenting the second content by the content-presentation device may entail ceasing playing out both the first video-content component and the first audio-content component, and beginning playing out both the second video-content component and the second audio-content component. In addition, playout of the second audio-content component may begin at a zero volume level. As illustrated in FIG. 5, this may be set by the Fading Function 506 evaluated at the switch time.

In accordance with example embodiments, the second content may be different from the first content.

In accordance with example embodiments, receiving the first content at the content-presentation device may entail receiving the first content on a first input of the content-presentation device, and from a first content distribution source. Similarly receiving the second content at the content-presentation device may entail receiving the second content on a second input of the content-presentation device, and from a second content distribution source. The first input may be the same or different than the second input, and, similarly the first content distribution source may be the same or different than the second content distribution source.

In accordance with example embodiments, receiving the second content at the content-presentation device may involve receiving at least the at least a portion of second audio-content component prior to the beginning of the first time interval. This is illustrated, for example, in FIG. 5 by the complete arrival of Received Second Content 504 prior to the start of the first time interval at $T_{1\text{-}fadeout}$.

In accordance with example embodiments, presenting the first content further entails playing out the first content as a first temporal sequence of first-content data, and presenting the second content further entails playing out the second content as a second temporal sequence of second-content data. Then, determining the upcoming switch time may involve (1) determining a first point in the first temporal sequence of playout at which the first content has been pre-determined to be replaceable with alternate content; and (2) determining a second point in the second temporal sequence of playout at which the second content has been pre-determined be replacement content. The switch time may then be determined to be a time that will align with both the first point and the second point.

In further accordance with example embodiments, determining the first point may involve receiving first metadata that includes first timing information indicating the first point and/or that includes first information from which the first timing information is derivable. Similarly, determining the second point may involve receiving second metadata that includes second timing information indicating the second point and/or that includes second information from which the second timing information is derivable.

In accordance with example embodiments, the first content may include or be made up of a first temporal sequence of content segments, each having a first segment length. Similarly, the second content may include or be made up of a second temporal sequence of content segments, each having a second segment length. With this arrangement, presenting the first content further may involve playing out one or more entire content segments of the first temporal sequence in temporal order, and similarly, presenting the second content further may involve playing out one or more entire content segments of the second temporal sequence in temporal order. Also with this arrangement, the switch time is aligned with the end of a given first content segment of the first sequence and the beginning of a given second content segment of the second sequence. Then, in at least one example, the first time interval may be a fraction of the first segment length of the given first content segment, and the second time interval may be a fraction of the second segment length of the given second content segment. For example, each of the first time interval and the second time interval may be one second in length, and each of the given first and second content segments may be greater than one second in length. In a typical implementation, each of the given first and second content segments may be several seconds in length, and each of the first time interval and the second time interval may be sufficiently short so as render the volume adjustment (e.g., fading out and fading in) imperceptible (or nearly so) to a user of the content-presentation device, but sufficiently long so as to effectively mask or hide any otherwise audible audio artifact that might arise at the switch time.

In accordance with example embodiments, the example method 600 may further entail the same or a similar volume adjustment (e.g., fading out and fading in) at a subsequent switch-back time, when playout of the second content ceases and playout of the first content resumes. This operation is similar to the volume adjustment described above for the switch from playing out first content to playing out the second content, except that content switching is in reverse. Thus, the switch-back may entail determining an upcoming switch-back time that is after the switch time and at which to both (i) cease presenting the second content by the content-presentation device and (ii) begin presenting the first content by the content-presentation device. Switch-back may further entail, during a third time interval beginning at a third time prior to the switch-back time and ending at the switch-back time, fading the second adjustable volume of the second audio-content component to zero by the end of the third time interval, and at the switch-back time, switching from presenting the second content to presenting the first content by the content-presentation device. Then, during a fourth time interval beginning at the switch-back time and ending at a fourth time after the switch-back time, the first adjustable volume of the first audio-content component may be increased from zero to a non-zero volume level by the end of the fourth time interval. An example of the switch-back operations are illustrated in FIG. 5 by the Content Playout 508 between $T_{2\text{-}fadeout}$ and $T_{switch}$-back and between $T_{switch}$-back and $T_{2\text{-}fadeout}$, as discussed above.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
receiving first content at a content-presentation device and presenting the first content by the content-presentation device, the first content comprising at least a first audio-content component, wherein presenting the first content comprises playing out at least a portion of the first audio-content component at a first adjustable volume;
receiving second content at the content-presentation device, the second content comprising at least a second audio-content component, wherein the second audio-content component is different from the first audio-content component;
determining an upcoming switch time at which to both (i) cease presenting the first content by the content-presentation device and (ii) begin presenting the second content by the content-presentation device, wherein presenting the second content comprises playing out at least a portion of the second audio-content component at a second adjustable volume;
during a first time interval beginning at a first time prior to the switch time and ending at the switch time, fading the first adjustable volume of the first audio-content component to zero by the end of the first time interval;
at the switch time, switching from presenting the first content to presenting the second content by the content-presentation device; and
during a second time interval beginning at the switch time and ending at a second time after the switch time, increasing the second adjustable volume of the second audio-content component from zero to a non-zero volume level by the end of the second time interval,
wherein switching from presenting the first content to presenting the second content by the content-presentation device comprises:
at the switch time, ceasing playing out the first audio-content component; and
at the switch time, beginning playing out the second audio-content component at a zero volume level.

2. The method of claim 1, wherein the first content further comprises a first video-content component, and wherein presenting the first content further comprises playing out at least a portion of the first video-content component,
and wherein the second content further comprises a second video-content component, and wherein presenting the second content further comprises playing out at least a portion of the second video-content component.

3. The method of claim 2, wherein switching from presenting the first content to presenting the second content by the content-presentation device further comprises:
ceasing playing out the first video-content component; and
beginning playing out the second video-content component.

4. The method of claim 2, wherein the second video-content component is different from the first video-content component.

5. The method of claim 1, wherein receiving the first content at the content-presentation device comprises receiving the first content on a first input of the content-presentation device and from a first content distribution source,
wherein receiving the second content at the content-presentation device comprises receiving the second content on a second input of the content-presentation device and from a second content distribution source,
wherein the first input is one of the same or different than the second input,
and wherein the first content distribution source is one of the same or different than the second content distribution source.

6. The method of claim 1, wherein receiving the second content at the content-presentation device comprises receiving at least the at least a portion of second audio-content component prior to the beginning of the first time interval.

7. The method of claim 1, wherein presenting the first content further comprises playing out the first content as a first temporal sequence of first-content data,
wherein presenting the second content further comprises playing out the second content as a second temporal sequence of second-content data,
and wherein determining the upcoming switch time comprises:
receiving first metadata including at least one of (i) first timing information indicating a first point in the first temporal sequence at which the first content has been pre-determined to be replaceable with alternate content, or (ii) first information from which the first timing information is derivable;
receiving second metadata including at least one of (i) second timing information indicating a second point in the second temporal sequence at which the second content has been pre-determined be replacement content, or (ii) second information from which the second timing information is derivable; and
determining an upcoming time that will align with both the first point and the second point.

8. The method of claim 1, wherein the first content further comprises a first temporal sequence of content segments, each having a first segment length,
wherein the second content further comprises a second temporal sequence of content segments, each having a second segment length,
wherein presenting the first content further comprises playing out one or more entire content segments of the first temporal sequence in temporal order,
wherein presenting the second content further comprises playing out one or more entire content segments of the second temporal sequence in temporal order,
wherein the switch time is aligned with the end of a given first content segment of the first sequence and the beginning of a given second content segment of the second sequence,
wherein the first time interval is a fraction of the first segment length of the given first content segment,
and wherein the second time interval is a fraction of the second segment length of the given second content segment.

9. The method of claim 8 wherein the first time interval is no greater than one second in length, and wherein the second time interval is no greater than one second in length.

10. The method of claim 1, further comprising:
determining an upcoming switch-back time that is after the switch time and at which to both (i) cease presenting the second content by the content-presentation device and (ii) begin presenting the first content by the content-presentation device;
during a third time interval beginning at a third time prior to the switch-back time and ending at the switch-back time, fading the second adjustable volume of the second audio-content component to zero by the end of the third time interval;
at the switch-back time, switching from presenting the second content to presenting the first content by the content-presentation device; and
during a fourth time interval beginning at the switch-back time and ending at a fourth time after the switch-back time, increasing the first adjustable volume of the first audio-content component from zero to a non-zero volume level by the end of the fourth time interval.

11. A content-presentation device comprising:
a content-presentation element configured for presenting content received by the content-presentation device;
one or more processors; and
a non-transitory computer-readable storage medium having stored thereon program instructions that, upon execution by the one or processors, cause the content-presentation device to carry out operations including:
receiving first content and presenting the first content by the content-presentation element, the first content comprising at least a first audio-content component, wherein presenting the first content comprises playing out at least a portion of the first audio-content component at a first adjustable volume;
receiving second content, the second content comprising at least a second audio-content component, wherein the second audio-content component is different from the first audio-content component;
determining an upcoming switch time at which to both (i) cease presenting the first content by the content-presentation element and (ii) begin presenting the second content by the content-presentation element, wherein presenting the second content comprises playing out at least a portion of the second audio-content component at a second adjustable volume;
during a first time interval beginning at a first time prior to the switch time and ending at the switch time, fading the first adjustable volume of the first audio-content component to zero by the end of the first time interval;
at the switch time, switching from presenting the first content to presenting the second content by the content-presentation element; and
during a second time interval beginning at the switch time and ending at a second time after the switch time, increasing the second adjustable volume of the second audio-content component from zero to a non-zero volume level by the end of the second time interval,
wherein switching from presenting the first content to presenting the second content by the content-presentation device comprises:
at the switch time, ceasing playing out the first audio-content component; and
at the switch time, beginning playing out the second audio-content component at a zero volume level.

12. The content-presentation device of claim 11, wherein the first content further comprises a first video-content component, and wherein presenting the first content further comprises playing out at least a portion of the first video-content component,
and wherein the second content further comprises a second video-content component, and wherein presenting the second content further comprises playing out at least a portion of the second video-content component.

13. The content-presentation device of claim 12, wherein switching from presenting the first content to presenting the second content by the content-presentation element comprises:
ceasing playing out the first video-content component; and
beginning playing out the second video-content component.

14. The content-presentation device of claim 11, wherein receiving the first content comprises receiving the first content on a first input of the content-presentation device and from a first content distribution source,
wherein receiving the second content comprises receiving the second content on a second input of the content-presentation device and from a second content distribution source,
wherein the first input is one of the same or different than the second input,
and wherein the first content distribution source is one of the same or different than the second content distribution source.

15. The content-presentation device of claim 11, wherein receiving the second content comprises receiving at least the at least a portion of second audio-content component prior to the beginning of the first time interval.

16. The content-presentation device of claim 11, wherein presenting the first content further comprises playing out the first content as a first temporal sequence of first-content data,
wherein presenting the second content further comprises playing out the second content as a second temporal sequence of second-content data,
and wherein determining the upcoming switch time comprises:
receiving first metadata including at least one of (i) first timing information indicating a first point in the first temporal sequence at which the first content has been pre-determined to be replaceable with alternate content, or (ii) first information from which the first timing information is derivable;
receiving second metadata including at least one of (i) second timing information indicating a second point in the second temporal sequence at which the second content has been pre-determined be replacement content, or (ii) second information from which the second timing information is derivable; and
determining an upcoming time that will align with both the first point and the second point.

17. The content-presentation device of claim 11, wherein the first content further comprises a first temporal sequence of content segments, each having a first segment length,
wherein the second content further comprises a second temporal sequence of content segments, each having a second segment length,
wherein presenting the first content further comprises playing out one or more entire content segments of the first temporal sequence in temporal order,
wherein presenting the second content further comprises playing out one or more entire content segments of the second temporal sequence in temporal order,
wherein the switch time is aligned with the end of a given first content segment of the first sequence and the beginning of a given second content segment of the second sequence,
wherein the first time interval is a fraction of the first segment length of the given first content segment,
and wherein the second time interval is a fraction of the second segment length of the given second content segment.

18. The content-presentation device of claim 11, wherein the operations further include:
determining an upcoming switch-back time that is after the switch time and at which to both (i) cease presenting the second content by the content-presentation element and (ii) begin presenting the first content by the content-presentation element;
during a third time interval beginning at a third time prior to the switch-back time and ending at the switch-back time, fading the second adjustable volume of the second audio-content component to zero by the end of the third time interval;
at the switch-back time, switching from presenting the second content to presenting the first content by the content-presentation element; and
during a fourth time interval beginning at the switch-back time and ending at a fourth time after the switch-back time, increasing the first adjustable volume of the first audio-content component from zero to a non-zero volume level by the end of the fourth time interval.

19. A non-transitory computer-readable storage medium having stored thereon program instructions that, upon execution by one or more processors of a system comprising a content-presentation device, cause the system to carry out operations including:
receiving first content at the system and presenting the first content by the content-presentation device, the first content comprising at least a first audio-content component, wherein presenting the first content comprises playing out at least a portion of the first audio-content component at a first adjustable volume;
receiving second content at the system, the second content comprising at least a second audio-content component, wherein the second audio-content component is different from the first audio-content component;
determining an upcoming switch time at which to both (i) cease presenting the first content by the content-presentation device and (ii) begin presenting the second content by the content-presentation device, wherein presenting the second content comprises playing out at least a portion of the second audio-content component at a second adjustable volume;
during a first time interval beginning at a first time prior to the switch time and ending at the switch time, fading the first adjustable volume of the first audio-content component to zero by the end of the first time interval;
at the switch time, switching from presenting the first content to presenting the second content by the content-presentation device; and
during a second time interval beginning at the switch time and ending at a second time after the switch time, increasing the second adjustable volume of the second audio-content component from zero to a non-zero volume level by the end of the second time interval,
wherein switching from presenting the first content to presenting the second content by the content-presentation device comprises:
at the switch time, ceasing playing out the first audio-content component; and
at the switch time, beginning playing out the second audio-content component at a zero volume level.

20. The non-transitory computer-readable storage medium of claim 19, wherein the operations further include:
determining an upcoming switch-back time that is after the switch time and at which to both (i) cease presenting the second content by the content-presentation device and (ii) begin presenting the first content by the content-presentation device;
during a third time interval beginning at a third time prior to the switch-back time and ending at the switch-back time, fading the second adjustable volume of the second audio-content component to zero by the end of the third time interval;
at the switch-back time, switching from presenting the second content to presenting the first content by the content-presentation device; and during a fourth time interval beginning at the switch-back time and ending at a fourth time after the switch-back time, increasing the first adjustable volume of the first audio-content component from zero to a non-zero volume level by the end of the fourth time interval.

* * * * *